United States Patent
Watanabe (10) Patent No.: US 11,009,991 B2
(45) Date of Patent: May 18, 2021

(54) DISPLAY CONTROL APPARATUS AND CONTROL METHOD FOR THE DISPLAY CONTROL APPARATUS

(71) Applicant: CANON KABUSHIKI KAISHA, Tokyo (JP)

(72) Inventor: Hitoshi Watanabe, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/668,709

(22) Filed: Oct. 30, 2019

(65) Prior Publication Data

US 2020/0142528 A1 May 7, 2020

(30) Foreign Application Priority Data

Nov. 7, 2018 (JP) .............................. JP2018-209828

(51) Int. Cl.
*G06F 3/041* (2006.01)
*G06F 3/0488* (2013.01)

(52) U.S. Cl.
CPC ........ *G06F 3/0416* (2013.01); *G06F 3/04886* (2013.01)

(58) Field of Classification Search
CPC .... G06F 3/0416; G06F 3/04886; G06F 3/017; G06F 3/04883; G06F 3/0487; G06F 3/0488; G06F 2203/04808
See application file for complete search history.

(56) References Cited

U.S. PATENT DOCUMENTS

| | | | | |
|---|---|---|---|---|
| 5,664,128 A | * | 9/1997 | Bauer | G06F 3/0483 715/708 |
| 5,678,066 A | * | 10/1997 | Sato | G02B 27/646 348/78 |
| 8,780,251 B2 | * | 7/2014 | Imai | H04N 5/232935 348/333.02 |
| 8,875,050 B2 | * | 10/2014 | Sirpal | G06F 3/04812 715/802 |
| 2004/0078215 A1 | * | 4/2004 | Dahlin | G16H 70/60 705/2 |
| 2004/0135824 A1 | * | 7/2004 | Fitzmaurice | G06F 3/0482 715/856 |
| 2005/0137847 A1 | * | 6/2005 | Brun | G09B 7/00 704/4 |

(Continued)

FOREIGN PATENT DOCUMENTS

JP 2004086790 A 3/2004
JP 2010079412 A 4/2010

*Primary Examiner* — William Lu
(74) *Attorney, Agent, or Firm* — Rossi, Kimms & McDowell LLP (57) ABSTRACT

A display control apparatus includes a touch detecting unit 102 configured to detect a touch operation on a display screen, and a control unit 104 configured to, in response to a touch operation on an unspecified region of the display screen, display a predetermined item at a position corresponding to the touch operation on the first region, and in response to a touch operation on a specified region of the display screen which overlays the first region, display a plurality of options selectable by a touch operation in the specified region. In a case where a touch operation on the specified region is detected while the plurality of options are not displayed in the specified region, the control unit 104 controls to display the plurality of options in the second region.

12 Claims, 5 Drawing Sheets

(56) References Cited

U.S. PATENT DOCUMENTS

| | | | |
|---|---|---|---|
| 2008/0229232 A1* | 9/2008 | Schulz | G06F 3/0481 715/781 |
| 2009/0291707 A1* | 11/2009 | Choi | H04N 5/2257 455/556.1 |
| 2010/0020222 A1* | 1/2010 | Jones | H04N 5/232935 348/333.02 |
| 2010/0182248 A1* | 7/2010 | Chun | G06F 3/041 345/173 |
| 2011/0061023 A1* | 3/2011 | Kim | H04N 5/23216 715/810 |
| 2012/0210273 A1* | 8/2012 | Seong | G06F 3/0488 715/790 |
| 2012/0274796 A1* | 11/2012 | Choi | H04N 5/232 348/220.1 |
| 2013/0120386 A1* | 5/2013 | Wilensky | G06T 13/60 345/426 |
| 2013/0300674 A1* | 11/2013 | Davidson | G06F 3/04883 345/173 |
| 2013/0326421 A1* | 12/2013 | Jo | G06F 3/04883 715/841 |
| 2013/0328902 A1* | 12/2013 | Grant | G06F 3/048 345/589 |
| 2014/0013234 A1* | 1/2014 | Beveridge | G06F 3/0488 715/740 |
| 2014/0063313 A1* | 3/2014 | Choi | H04N 5/23293 348/333.02 |
| 2014/0192244 A1* | 7/2014 | Ishihara | G06F 3/04897 348/333.02 |
| 2014/0306900 A1* | 10/2014 | Son | G06F 3/041 345/173 |
| 2015/0067563 A1* | 3/2015 | Bernstein | G06F 3/0488 715/769 |
| 2015/0103002 A1* | 4/2015 | Yoon | G06F 3/0488 345/157 |
| 2015/0177930 A1* | 6/2015 | Watanabe | G06F 3/04812 715/828 |
| 2016/0241776 A1* | 8/2016 | Kim | H04N 5/23218 |
| 2016/0259517 A1* | 9/2016 | Butcher | G06F 3/04845 |
| 2017/0332009 A1* | 11/2017 | Zhang | G06F 3/0482 |
| 2018/0198985 A1* | 7/2018 | Ishitsuka | H04N 5/23209 |
| 2019/0141258 A1* | 5/2019 | Yoshida | H04N 5/22525 |
| 2020/0379715 A1* | 12/2020 | Won | G06F 3/0488 |

* cited by examiner

DISPLAY CONTROL APPARATUS AND CONTROL METHOD FOR THE DISPLAY CONTROL APPARATUS

BACKGROUND OF THE INVENTION

Field of the Invention

The present invention relates to a display control apparatus and a control method for the display control apparatus.

Description of the Related Art

As a touch panel apparatus which is provided in various types of electronic equipment, one equipped with a function of, when a predetermined button (operating component) being displayed is operated, disabling operation on a button adjacent to the operated button for a predetermined time period is known (see, for example, Japanese Laid-Open Patent Publication (Kokai) No. 2004-86790). A touch panel apparatus with its display layout designed to prevent original options from being hidden while information relating to one of the options selected by a touch operation is displayed is known as well (see, for example, Japanese Laid-Open Patent Publication (Kokai) No. 2010-79412).

The touch panel apparatus doubles as a display apparatus. Thus, it is preferred that a focus guide indicating a position at which a live image is brought into focus while it is displayed on a digital camera, and GUI buttons for activating various functions of the digital camera are displayed on the same screen at the same time. Moreover, the live image is displayed as large as possible, and hence in many cases, it is displayed in full screen and the GUI buttons is displayed superimposed on the live image. In those cases, the focus guide may be hidden by the GUI buttons, making it impossible to operate the focus guide.

Here, the position at which the focus guide is displayed varies with subjects generally and is also a movable component that can be moved by user operation. Namely, any position on the screen can be the position at which the focus guide is displayed. According to the prior art, however, the positions at which the GUI buttons are displayed cannot be changed, and thus when the focus guide overlaps the GUI buttons, it becomes impossible to operate the focus guide. Moreover, some GUI buttons are preferably displayed at fixed positions on the screen which are specific locations the user is accustomed to use (fixed components). It is not preferable to change their display positions and sizes of such fixed components.

SUMMARY OF THE INVENTION

The present invention provides a display control apparatus which enables increasing the ease of operation of a movable component while ensuring the ease of operation of a fixed component.

Accordingly, the present invention provides a display control apparatus including a touch detecting unit configured to detect a touch operation on a display screen, and a control unit configured to, in response to a touch operation on a first region of the display screen, display a predetermined item at a position corresponding to the touch operation on the first region, and in response to a touch operation on a second region of the display screen which overlays the first region, display a plurality of options selectable by a touch operation in the second region, wherein in a case where a touch operation on the second region is detected while the plurality of options are not displayed in the second region, the control unit controls to display the plurality of options in the second region.

According to the present invention, the ease of operation of the movable component is increased while the ease of operation of the fixed component is ensured.

Further features of the present invention will become apparent from the following description of exemplary embodiments (with reference to the attached drawings).

DESCRIPTION OF THE EMBODIMENTS

An embodiment of the present invention will now be described in detail with reference to the attached drawings. It is assumed here that a touch panel apparatus which has a touch panel as a display device is taken up as a display control apparatus according to the embodiment of the present invention.

Figure 1:
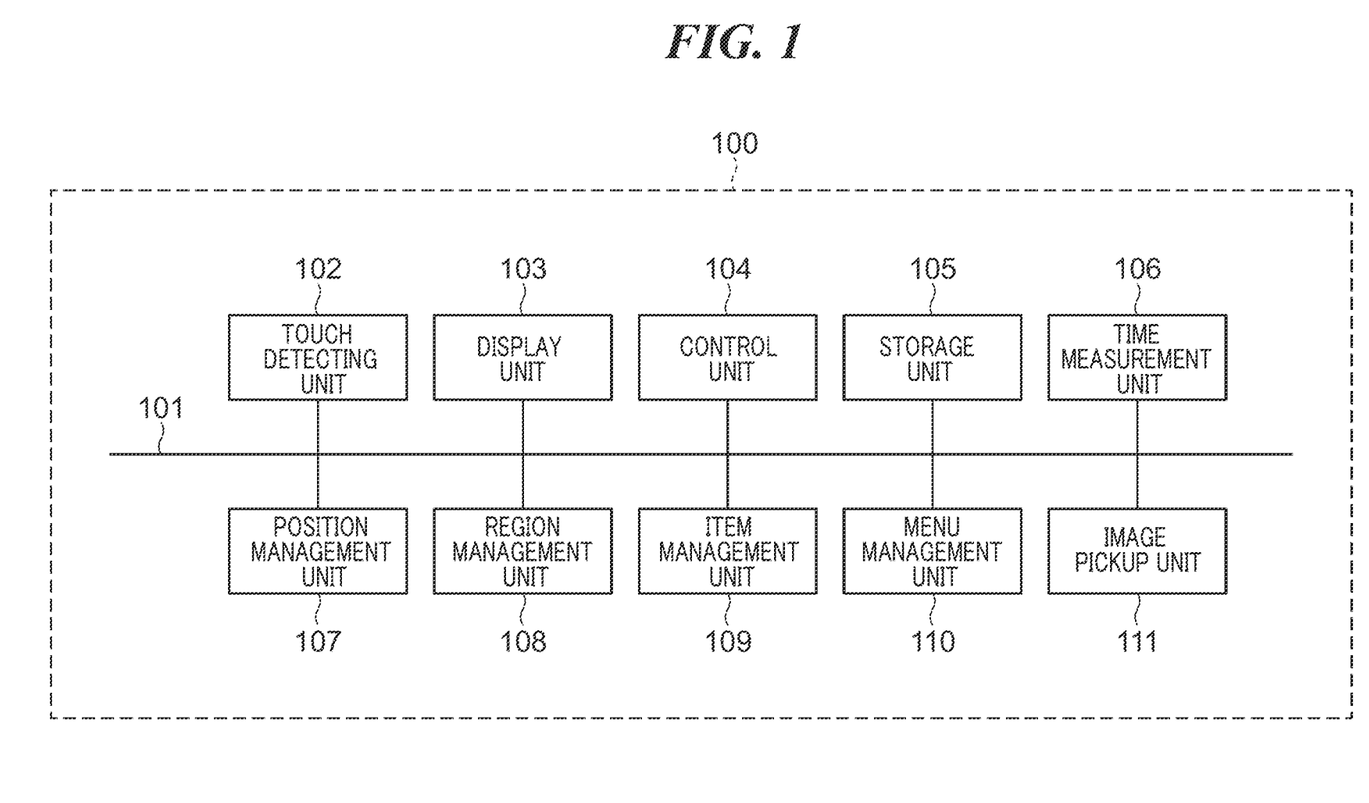
FIG. 1 is a block diagram schematically showing an arrangement of a touch panel apparatus according to an embodiment.

FIG. 1 is a block diagram schematically showing an arrangement of the touch panel apparatus according to the embodiment of the present invention. The touch panel apparatus 100 has a touch detecting unit 102, a display unit 103, a control unit 104, a storage unit 105, a time measuring unit 106, a position management unit 107, a region management unit 108, an item management unit 109, a menu management unit 110, and an image pickup unit 111, which are connected to one another via a bus 101 such that they can communicate with one another. Each of these blocks is implemented by, for example, a combination of software (program) and hardware, but may be implemented by either software or hardware, depending on functions of the block.

The control unit 104 controls the overall operation of the touch panel apparatus 100 by sending commands to each block (each unit) through the bus 101 and also obtaining information from each block. Each block that has received a command from the control unit 104 executes the received command and sends its result (information) to the control unit 104 via the bus 101. It should be noted that for some types of processing, predetermined blocks may be configured to send and receive commands and data to and from each other without involvement by the control unit 104.

The image pickup unit 111 has a lens and an image pickup sensor such as a CMOS sensor, not shown, and in accordance with an instruction from the control unit 104, sends a captured video signal to the display unit 104. The display unit 103 displays the video signal, which has been obtained from the image pickup unit 111, as a live image a display screen such as a liquid crystal panel. It is assumed here that the display screen of the display unit 103 is a rectangle with its width longer than its length.

The touch detecting unit 102 includes a touch panel overlaid on (the liquid crystal panel of) the display unit 103. A user (photographer) intuitively recognizes a touch operation on the touch panel as a touch operation on the display screen of the display unit 103, and hence the display screen of the display unit 103 can be regarded as an operating screen. The touch detecting unit 102 detects coordinates of a touch point on the touch panel to detect an operation such as a finger or the like touching the display unit 103 (the touch panel) (hereafter referred to as "touch-on") and a finger being removed from the touch panel (hereafter referred to as "touch-off"). The touch detecting unit 102 is also able to detect a movement (path) of coordinates of a touch point to detect "drag," in which a touched position is shifted after touch-on without removing the finger from the touch panel.

It should be noted that in a touch operation using a fingertip on the display unit 103, a touch point has a predetermined area. In this case, it is assumed that the touch detecting unit 102 recognizes a barycentric position of a touch point having the predetermined area as a position of the touch point, that is, coordinates of the touch point. The touch detecting unit 102 detects a touch operation performed on the display unit 103 by detecting such as an appearance, movement, disappearance of a touch point, but for the sake of convenience, it is described below as "the touch detecting unit 102 detects a touch operation."

Upon detecting a touch operation on the display unit 103, the touch detecting unit 102 notifies the control unit 104 of the detected touch operation as an event and also notifies the position management unit 107 of coordinates of a touch point. The position management unit 107 manages the coordinates of which it has been notified. Thus, when a touch operation is performed on the display unit 103 while a live image is being displayed on the display unit 103, a position of the live image which has been touched can be detected. It should be noted that the touch detecting unit 102 is also able to detect other ordinary operations (e.g. pinch-in, pinch-out, flick) on the touch panel.

It should be noted that in many cases, the user senses a touch operation on the touch panel as a touch operation on an image being displayed on the display unit 103. Thus, in the following description, "a touch operation on the touch panel overlaid on the display unit 103 has been performed" is expressed as, for example, "touch operation on the display unit 103 has been performed".

The item management unit 109 manages items such as icons and characters that are to be displayed on the display unit 103. For example, upon detecting touch-on on the display unit 103 while a live image is being displayed, the touch detecting unit 102 notifies the control unit 104 and the position management unit 107 of touched-on coordinates. The control unit 104 obtains an item to be displayed on the display unit 103 from the item management unit 109 and controls display on the display unit 103 to display the obtained item at the coordinates obtained from the touch detecting unit 102. Accordingly, marking a specific place on the live image can be performed. It should be noted that the position management unit 107 manages the marked coordinates as needed.

The menu management unit 110 manages a menu (selectable menu options) which is an example of a fixed component to be displayed on the display unit 103. The control unit 104 determines an operating state of the touch panel apparatus 100, obtains a menu for activating executable functions from the menu management unit 110, and displays it on the display unit 103. When the touch detecting unit 102 notifies the control unit 104 that there has been touch-on for selecting a predetermined function from the menu displayed on the display unit 103, the control unit 104 activates the selected function.

The region management unit 108 divides the display unit 103 into a plurality of regions, assigns roles to the respective regions, and manages them. In the present embodiment, as will be described later with reference to FIG. 4, the region management unit 108 sets the entire display screen of the display unit 103 as an unspecified region (first region) and sets a region, which is the right-most one of four divided regions in a case where the entire display screen of the display unit 103 is horizontally divided into four, as a specified region (second region). Namely, the specified region is a part of the unspecified region, which overlaps the unspecified region. When the touch detecting unit 102 notifies the control unit 104 that there has been touch-on on the specified region, the control unit 104 usually obtains a predetermined menu from the menu management unit 110 and displays it in the specified region. Also, when the touch detecting unit 102 notifies the control unit 104 that there has been touch-on on the unspecified region outside the specified region, the control unit 104 usually obtains a predetermined item from the item management unit 109 and displays the obtained predetermined item at a touch position on the unspecified region on the display unit 103.

The storage unit 105 stores various types of data (including programs) required to operate the blocks. It should be noted that the storage unit 105 acts as a work area (work memory) required for each block to execute a program, but the configuration is not limited to this, and each block may have its work memory. The time measuring unit 106, which is a system clock, starts measuring time in response to a notification of the start of time measurement from each block and returns an elapsed time in response to an inquiry from the block.

It should be noted that although in the present embodiment, the touch panel apparatus 100 is configured to be equipped with the image pickup unit 111, the image pickup unit 111 may be implemented by connecting an image pickup apparatus to the touch panel apparatus 100 such that they can communicate with each other.

Figure 2:
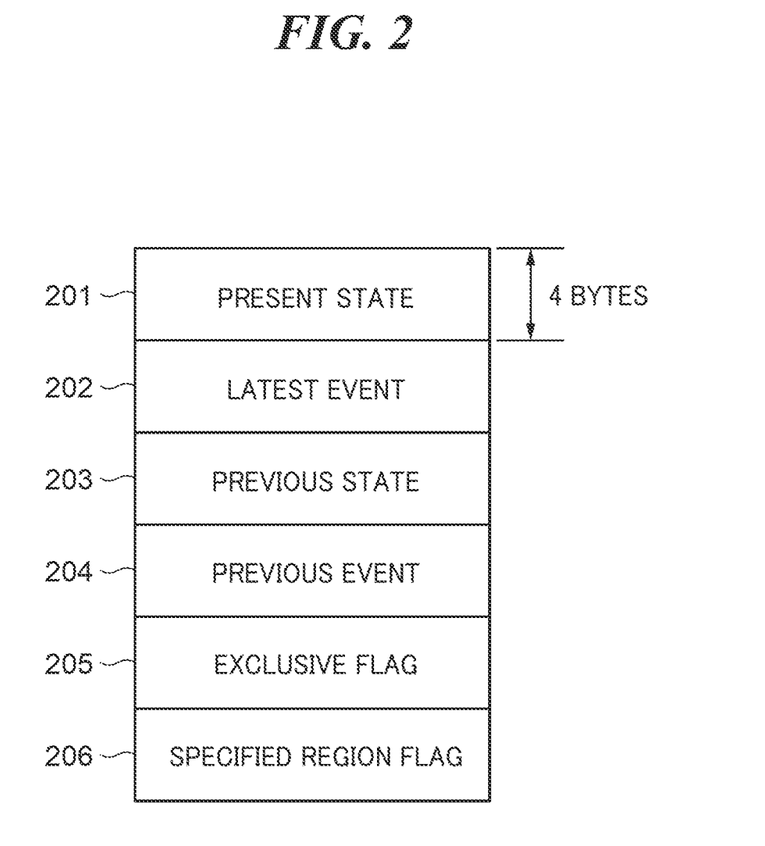
FIG. 2 is a diagram useful in explaining an arrangement of touch operation data in the touch panel apparatus.

FIG. 2 is a diagram useful in explaining an arrangement of data (hereafter referred to as "touch operation data") which is handled in relation to a touch operation on the display unit 103 in the touch panel apparatus 100. The touch operation data is held in the storage unit 105. As described earlier, upon detecting a touch operation on the display unit 103 (the touch panel), the touch detecting unit 102 notifies the control unit 104 of the detected touch operation as an event and also notifies the position management unit 107 of coordinates relating to the touch operation. Thus, the control unit 104 obtains an event occurrence position by inquiring the position management unit 107 of the coordinates at which the event occurred. The control unit 104 also notifies the region management unit 108 of the obtained event occurrence position and obtains region information to which the event occurrence position belongs from the region management unit 108.

The touch operation data includes six pieces of data, each of which has a data length of four bytes. The data length, however, is not limited to this. The first data is a "present state 201" that is data digitized so as to determine which one of first to fourth states described below is a present state of which the display unit 103. The first state is a state in which neither an item nor a menu is displayed on the display unit 103. The second state is a state in which no menu is displayed on the display unit 103 although an item is displayed on the display unit 103. The third state is a state in which a menu is displayed on the display unit 103 although no item is displayed on the display unit 103. The fourth state is a state in which both an item and a menu are displayed on the display unit 103. The control unit 104 manages these states of the display unit 103.

The second data is a "latest event 202" that is data digitized so as to indicate a latest event. The third data is a "previous state 203" that is data digitized so as to indicate a previous state. The previous state is a state immediately before the latest event occurs, that is, a state that continues until the latest event occurs. The fourth event is a "previous event 204" that is data digitized to indicate an event previous to the latest event.

When a new event has occurred, the "present state 201" and the "latest event 202" are moved to the "previous event 203" and the "previous event 204", respectively, and then stored. The latest event 202 is updated to data that identifies the new event and then stored, and the present state 201 is updated to data that identifies a state after the new event occurred and then stored.

The fifth data is an "exclusive flag 205" that is data digitized so as to indicate whether display of an item and display of a menu are mutually exclusive (they have such an exclusive relationship that one is displayed while the other one is not displayed). When display of an item and display of a menu are mutually exclusive, the exclusive flag 205 is on, and an item and a menu are not displayed at the same time. The sixth data is a "specified region flag 206" that is data digitized so as to indicate whether the latest event occurred in the specified region set on the display screen of the display unit 103. The control unit 104 provides different types of control according to whether an event occurred in the specified region as will be described later in detail. It should be noted that the first to sixth data constituting the touch operation data in FIG. 2 are only examples, and the touch operation data may include more pieces of data.

Figure 3:
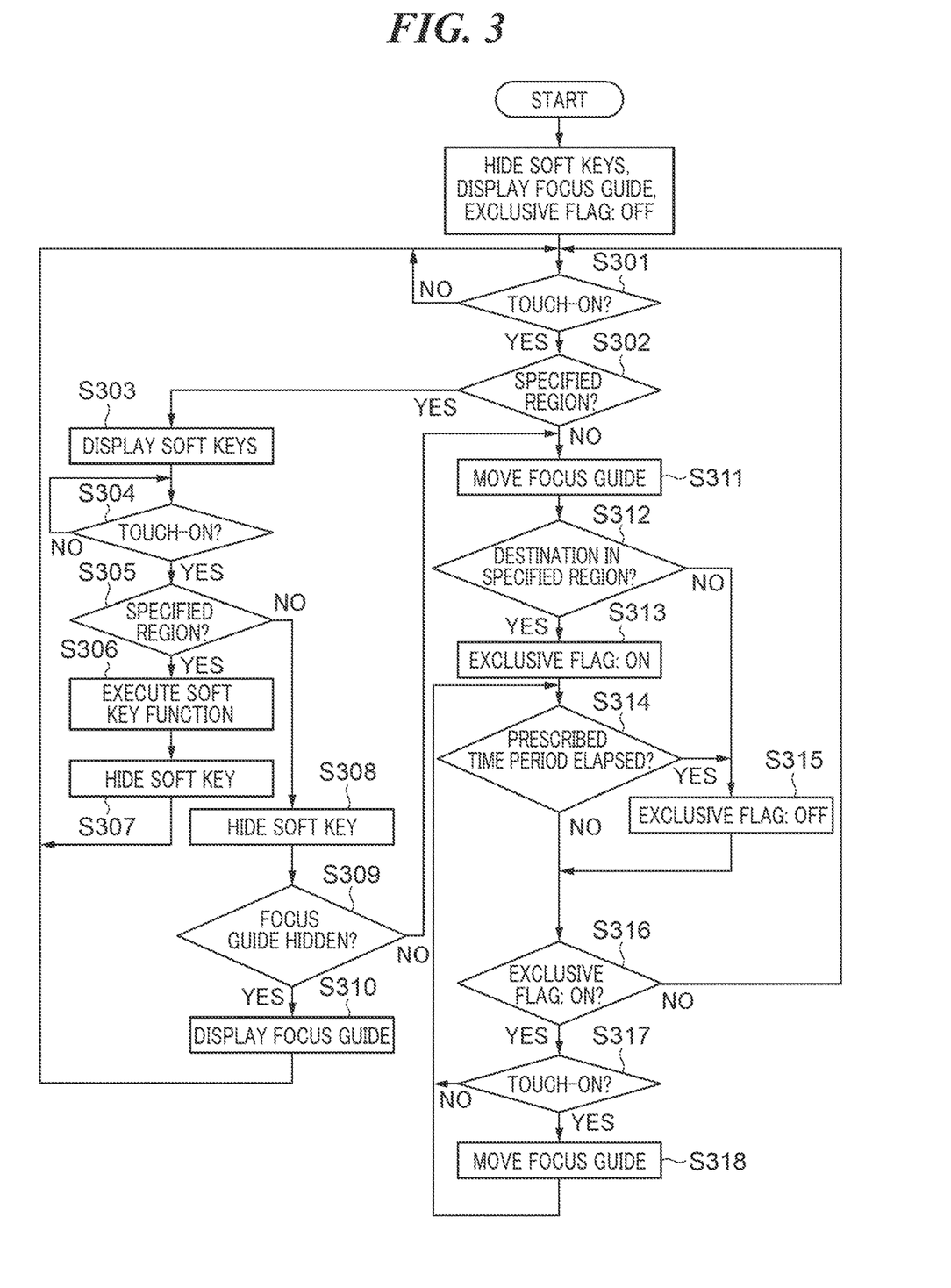
FIG. 3 is a flowchart useful in explaining how display on the touch panel apparatus is controlled.

FIG. 3 is a flowchart useful in explaining how display on the touch panel apparatus 100 is controlled. Processes (steps) designated by S numbers in FIG. 3 are implemented by the control unit 104 executing a program stored in the storage unit 105 to integratedly control operation of the components constituting the touch panel apparatus 100.

Here, a focus guide is taken up as an item (movable component) that is displayed at a touch position in response to a touch operation on the display unit 103. The focus guide indicates a part of a live image displayed on the display unit 103 to which auto focus is applied, and the image pickup unit 111 performs a focusing operation for a subject on which the focus guide is overlaid. The focus guide identifies a subject that is desired to be focused by the user. It is thus preferred that the focus guide can be displayed in the entire display screen (the unspecified region) of the display unit 103 without its position being limited, and also the focus guide can be moved over the entire display screen. Soft keys are taken up as a menu (fixed component) displayed in the specified region of the display unit 103. When the touch detecting unit 102 notifies the control unit 104 that an event indicating touch-on on a soft key, the control unit 104 activates a function associated with the touched soft key and then hides the soft key.

It is assumed that when display control following the flowchart of FIG. 3 is started, a live image is displayed on the display unit 103, the focus guide is displayed at a predetermined position, the soft keys are hidden, and the exclusive flag 205 is OFF. When the process is started, the control unit 104 determines, in step S301, whether the touch detecting unit 102 has detected touch-on. The control unit 104 stands by until it determines that touch-on has been detected (NO in the step S301), and when the control unit 104 determines that touch-on has been detected (YES in the step S301), the process proceeds to the step S302.

When touch-on occurs in the step S301, the region management unit 108 determines whether a region where touch-on has occurred is the specified region and notifies the control unit 104 of the determination result. The control unit 104 determines, in step S302, whether touch-on has occurred in the specified region based on the determination result notified from the region management unit 108. When the control unit 104 determines that touch-on has occurred in the specified region (YES in the step S302), the process proceeds to step S303. On this occasion, the control unit 104 sets the specified region flag 206 to on.

In the step S303, the control unit 104 displays the soft key. This is because at the moment when the touch-on occurs in the specified region, the menu is hidden, and the exclusive flag 205 is OFF, and hence display of the menu is not excluded. On this occasion, when the focus guide is displayed inside the specified region, the soft keys are displayed while the focus guide is hidden, and when the focus guide is displayed outside the specified region, the soft keys are displayed while the focus guide is displayed. As the soft keys are displayed in the step S303, the present state 201 is updated to the menu being displayed, and the latest event 202 is updated to touch-on in the specified region. The state that has been indicated in the present state 201 is moved to the previous state 203.

Figure 4A:
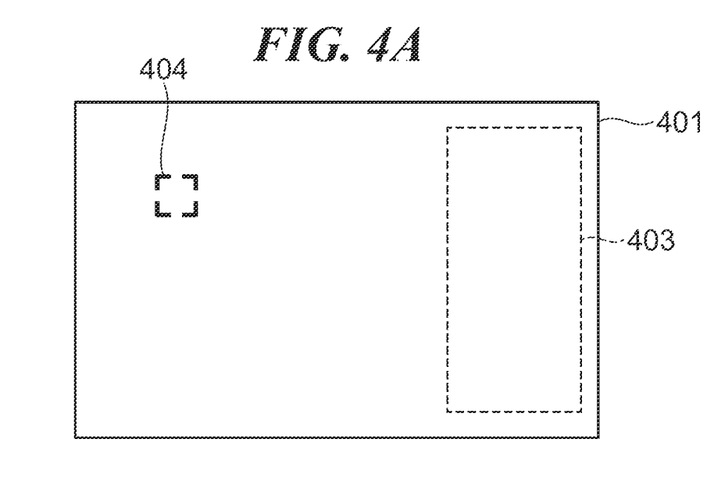
FIG. 4A is a diagram showing an example of a state at a point in time when processing is started.

A description will now be given of the process in the step S303 with reference to FIG. 4. FIG. 4 is a diagram showing examples of the soft keys and the focus guide displayed on the display unit 103. FIG. 4A shows an example of a state at a point in time when the process is started, that is, a state in which the soft keys are hidden in the specified region 403 set on the display screen 401 of the display unit 103, and the focus guide 404 is displayed outside the specified region 403. It should be noted that the specified region 403 is indicated by broken lines on the display screen 401, but actually no broken lines are displayed.

Figure 4B:
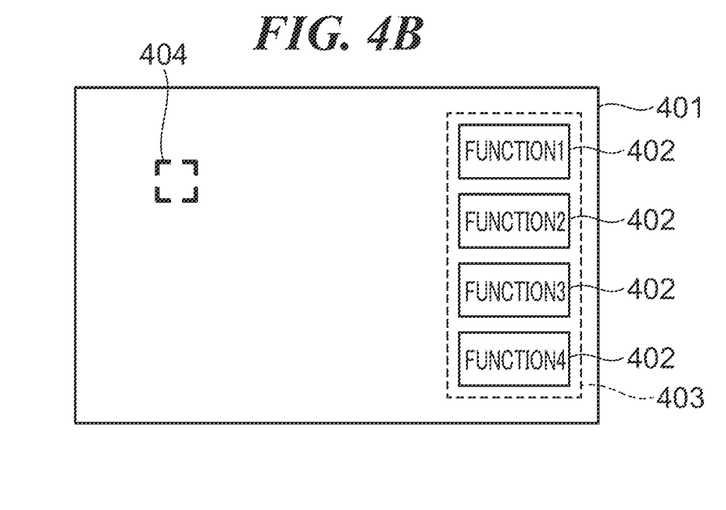
FIG. 4B is a diagram showing a state in which soft keys are displayed while a focus guide is displayed.

FIG. 4B shows a state in which the soft keys 402 are displayed while the focus guide 404 is displayed due to being processed the process from the S301 to the S303 in a state of FIG. 4A. It should be noted that although four soft keys 402 are shown in FIG. 4B, the number of soft keys 402 to be displayed is not limited to four. Illustrations of a state in which the focus guide 404 is displayed while no soft key is displayed in the specified region 403 at the start of processing, and a state after the process proceeds to the step S303 are omitted.

The processes in steps S304 and S305 correspond to the processes in the steps S301 and S302, respectively. Namely, in the step S304, the control unit 104 determines whether the touch detecting unit 102 has detected touch-on. The control unit 104 stands by until it determines that touch-on has been detected (NO in the step S304), and when the control unit 104 determines that touch-on has been detected (YES in the step S304), the process proceeds to the step S305. Based on a notification from the region management unit 108, the control unit 104 determines, in S305, whether touch-on has occurred in the specified region. When the control unit 104 determines that touch-on has occurred in the specified region (YES in the step S305), the process proceeds to step S306.

In the step S306, since a soft key is displayed at a location touched in the step S304, the control unit 104 executes a function associated with the touched soft key. In step S307, since the control unit 104 has activated the function associated with the soft key touched in the step S306, the control unit 104 updates the touch operation data (the present state 201 to the previous event 204) while hiding the entire soft key. The control unit 104 returns the process from the step S307 to the step S301. When the focus guide 404 lies inside the specified region, the control unit 104 controls to display the hidden focus guide 404.

When the control unit 104 determines in the step S305 that touch-on has not occurred in the specified region (NO in the step S305), the process proceeds to step S308, and on this occasion, the control unit 104 sets the specified region flag 206 to OFF. In the step S308, the control unit 104 hides the soft keys. In step S309, the control unit 104 determines whether the focus guide is hidden. It should be noted that when the focus guide is displayed in the specified region at the start of processing, the focus guide is hidden because the soft keys are displayed in the step S303. On the other hand, when the focus guide is displayed outside the specified region at the start of processing, the soft keys are displayed in the step S303 while the focus guide is displayed as well. When the control unit 104 determines that the focus guide is hidden (YES in the step S309), the process proceeds to step S310. In the step S310, the control unit 104 displays the focus guide, followed by the process returning to the step S301. The processes in the steps S304 to S310 described above are processes carried out in response to a touch operation when the soft keys are displayed.

When the control unit 104 determines that touch-on has not occurred in the specified region (NO in the step S302), the process proceeds to step S311. Also, when the control unit 104 determines that the focus guide is displayed in the step S309 (NO in the step S309), the process proceeds to the step S311. In the step S311, the control unit 104 recognizes an operation to move the focus guide has been performed. The reason is that the focus guide moves to a position according to a touch operation in touch-on in the step S301 or S304. In a case where the touch operation in touch-on in the step S301 or S304 is sliding touch (drag operation), the position at which the focus guide is displayed shifts in a sliding manner. The focus guide eventually moves to touch-up position and is displayed.

Figure 4C:
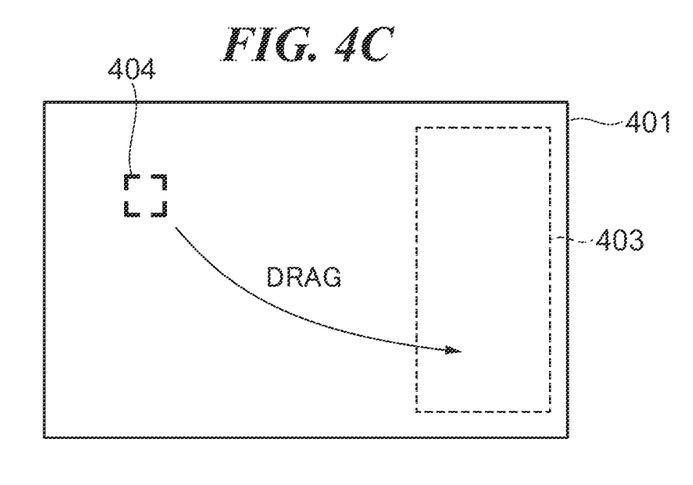
FIG. 4C is a diagram schematically showing how the focus guide is dragged to a specified area.
Figure 4D:
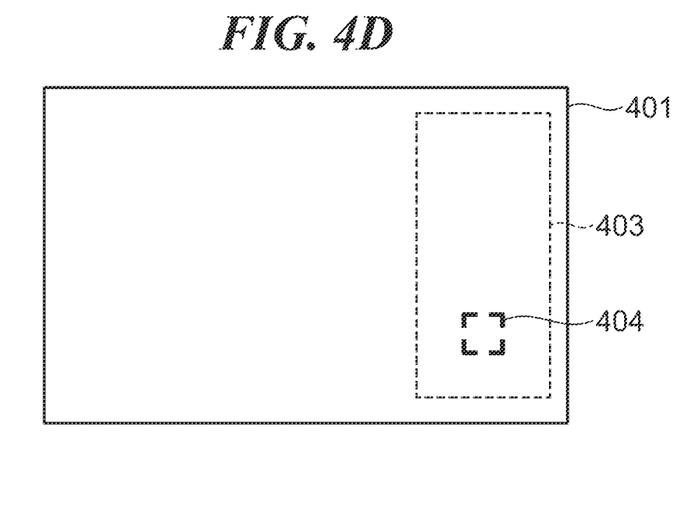
FIG. 4D is a diagram showing a state where the focus guide is displayed in the specified area.

In the step S312, the control unit 104 determines whether a destination of the focus guide is the specified region. When the control unit 104 determines that the destination of the focus guide is the specified region (YES in the step S312), the process proceeds to the step S313, and when the control unit 104 determines that the destination of the focus guide is a region outside the specified region (NO in the step S313 S312), the process proceeds to step S315. FIG. 4C schematically shows a drag operation of the focus guide 404 to the specified region 403 as an example of the movement of the focus guide 404 in the step S311. FIG. 4D shows a state in which the focus guide 404 is displayed in the specified region 403 as a result of the movement of the focus guide 404 to the specified region 403 in FIG. 4C.

In the step S313, the control unit 104 sets the exclusive flag 205 to ON. This aims at receiving an operation to move the focus guide without displaying the soft keys even when there is touch-on on specified region until a predetermined time period determined in advance (hereafter referred to as "the prescribed time period") has elapsed since the exclusive flag 205 was set to on. Namely, when the exclusive flag 205 is ON, the focus guide can be moved irrespective of a touched position until the prescribed timer period has elapsed. The processes in the steps S301, S302, and S311 to S313 are processes carried out in response to a touch operation in a case where the soft keys are hidden with the exclusive flag being OFF.

In the step S314 subsequent to the step S313, the control unit 104 determines whether the prescribed time period has elapsed. It should be noted that start of measurement of the prescribed time period is setting timing of the exclusive flag 205 in the step S313, but when the process proceeds to the step S313 via the steps S303 and S308, start of measurement of the prescribed time period may be timing that the soft keys are hidden in the step S308. When the control unit 104 determines that the prescribed time period has elapsed (YES in the step S314), the process proceeds to step S315. In the step S315, the control unit 104 sets the exclusive flag 205 to OFF, followed by the process proceeding to step S316. In the step S316, the control unit 104 determines whether the exclusive flag 205 is ON. When the control unit 104 determines that the exclusive flag 205 is OFF (NO in the step S316), the process returns to the step S301 so that processing can be performed in accordance with a touch operation with the exclusive flag 205 being OFF and the soft keys being hidden. On the other hand, when the control unit 104 determines that the exclusive flag 205 is ON (YES in the step S316), the process proceeds to step S317 so that processing can be performed in accordance with a touch operation with the exclusive flag 205 being ON and the soft keys being hidden.

The process in the step S317 is substantially the same as the process in the step S301. Namely, in the step S317, the control unit 104 determines whether the touch detecting unit 102 has detected touch-on. When the control unit 104 determines that touch-on has not been detected (NO in the step S317), the process returns to the step S314, and when the control unit 104 determines that touch-on has been detected (YES in the step S317), the process proceeds to step S318. In the step S318, the control unit 104 recognizes that an operation to move the focus guide has been performed, followed by the process returning to the step S314. The reason is that the focus guide moves to a position according to a touch operation in touch-on in the step S317. The processes in the steps S314 to S318 are processes carried out according to a touch operation in a case where the soft keys are hidden, and the exclusive flag 205 is set to ON.

As described above, according to the present embodiment, a menu that is preferably displayed at a fixed position within a screen can be displayed at the fixed position while the ease of operation for the displayed menu is ensured, and at the same time, an item can be displayed at a display position within the screen without limitations while the ease of operation for the displayed item is ensured.

In the above description referring to FIG. 4, the specified region 403 is set in the right-hand region inside the display screen 401 of the display unit 103 and fixed at this position. In the touch panel apparatus 100, however, a region where display of the menu (the soft keys) is excluded should not always be fixed but may be located only around the item (the focus guide). In this case, even when the item is displayed inside the specified region, the menu can be displayed by a touch operation on an area away from the item (other than an area near the item).

Figure 5:
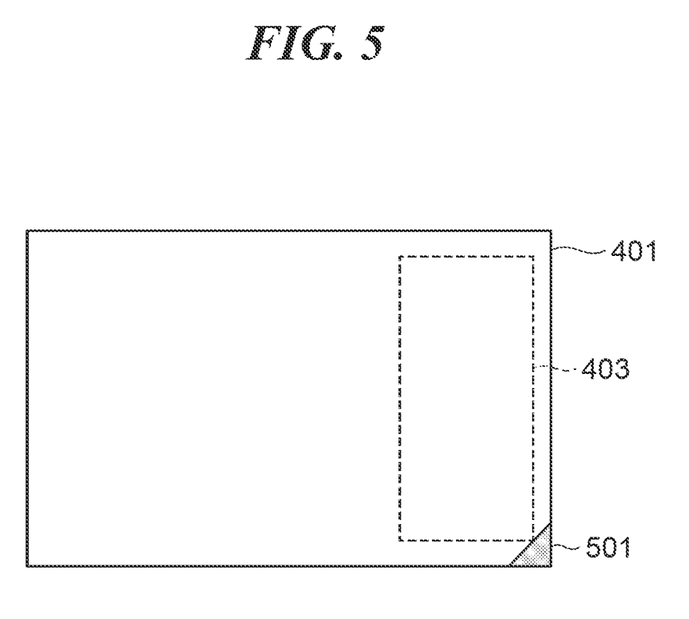
FIG. 5 is a diagram showing an arrangement in which a display unit menu drawer is provided.

Moreover, in the above description, the menu is displayed by touching the specified region on the screen of the display unit 103, but another method may alternatively be applied. FIG. 5 is a diagram showing an arrangement in which a menu drawer 501 which is an operating component for displaying the menu is provided on the screen of the display unit 103. The menu drawer 501 is a GUI for displaying and hiding the menu by touching it. With this arrangement, wherever the item is displayed in any position on the display screen 401, the user can display the menu in the specified region 403 by touching the menu drawer 501. It is preferred that the menu drawer 501 is displayed inside or close to the specified region 403, but this is not limitative.

Furthermore, although the touch panel apparatus 100 equipped with the image pickup unit 111 is taken as an example in the above description, the touch panel apparatus 100 should not always be equipped with the image pickup unit 111, but the above embodiment may be applied to various electronic devices equipped with a touch panel apparatus. For example, the display control described above is useful for displaying a menu of executable functions and items such as a destination mark, a present location mark, and a route created by dragging the present location mark when a map application, a navigation application, or the like is executed with a smartphone or the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-209828, filed Nov. 7, 2018, which is hereby incorporated by reference herein in its entirety.

What is claimed is:

1. A display control apparatus comprising:
   a touch detecting unit configured to detect a touch operation on a display screen; and
   a control unit configured to, in response to a touch operation on a first region of the display screen, display a predetermined item at a position corresponding to the touch operation on the first region, and in response to a touch operation on a second region of the display screen which overlays the first region, display a plurality of options selectable by a touch operation in the second region,
   wherein in a case where a touch operation on the second region is detected while the plurality of options are not displayed in the second region, the control unit controls to display the plurality of options in the second region,
   wherein in a case where the predetermined item has been moved to the second region by a touch operation, before a first predetermined time period has elapsed since the predetermined item was moved to the second region by the touch operation, the control unit controls such that the plurality of options are not displayed in the second region even when a touch operation on the second region is detected, and
   wherein in the case where the predetermined item has been moved to the second region by the touch operation, after the first predetermined time period has elapsed since the predetermined item was moved to the second region by the touch operation, the control unit controls such that the plurality of options are displayed in the second region in response to detection of a touch operation on the second region.

2. The display control apparatus according to claim 1, wherein in the case where the touch operation on the second region is detected while the plurality of options are not displayed in the second region, the control unit controls to display the plurality of options in the second region without moving the predetermined item to the position corresponding to the touch operation on the second region.

3. The display control apparatus according to claim 1, wherein in a case where a touch operation on one of the plurality of options is detected while the plurality of options is displayed in the second region, the control unit carries out a process according to the option on which the touch operation has been performed.

4. The display control apparatus according to claim 3, wherein in the case where the touch operation on one of the plurality of options is detected while the plurality of options is displayed in the second region, the control unit carries out the process according to the option on which the touch operation has been performed and hides the plurality of options that has been displayed in the second region.

5. The display control apparatus according to claim 1, wherein in a case where a touch operation on the first region is detected while the plurality of options are displayed in the second region, the control unit controls to hide the plurality of options.

6. The display control apparatus according to claim 5, wherein before a second predetermined time period has elapsed since the plurality of options was hidden, the control unit controls such that the plurality of options are not displayed in the second region even when a touch operation on the second region is performed.

7. The display control apparatus according to claim 6, wherein the control unit further controls to display the predetermined item at a position corresponding to the touch operation.

8. The display control apparatus according to claim 1, wherein the second region is a part of the first region.

9. The display control apparatus according to claim 1, wherein the control unit displays a focus guide as the predetermined item together with a live image taken by an image pickup unit.

10. The display control apparatus according to claim 9, further comprising the image pickup unit.

11. A control method for a display control apparatus comprising:

a first step of, in response to a touch operation on a first region of a display screen, displaying a predetermined item at a position corresponding to the touch operation on the first region;

a second step of, in response to a touch operation on a second region of the display screen which overlays the first region, displaying a plurality of options selectable by a touch operation in the second region, wherein, in the second step, in a case where a touch operation on the second region is detected while the plurality of options is not displayed in the second region, the plurality of options are displayed in the second region, wherein in a case where the predetermined item has been moved to the second region by a touch operation, before a first predetermined time period has elapsed since the predetermined item was moved to the second region by the touch operation, the control unit controls such that the plurality of options are not displayed in the second region even when a touch operation on the second region is detected, and wherein in the case where the predetermined item has been moved to the second region by the touch operation, after the first predetermined time period has elapsed since the predetermined item was moved to the second region by the touch operation, the control unit controls such that the plurality of options are displayed in the second region in response to detection of a touch operation on the second region.

12. A non-transitory computer-readable storage medium storing a computer-executable program that executes a control method for a display control apparatus, comprising:

a first step of, in response to a touch operation on a first region of a display screen, displaying a predetermined item at a position corresponding to the touch operation on the first region;

a second step of, in response to a touch operation on a second region of the display screen which overlays the first region, displaying a plurality of options selectable by a touch operation in the second region, wherein, in the second step, in a case where a touch operation on the second region is detected while the plurality of options is not displayed in the second region, the plurality of options are displayed in the second region, wherein in a case where the predetermined item has been moved to the second region by a touch operation, before a first predetermined time period has elapsed since the predetermined item was moved to the second region by the touch operation, the control unit controls such that the plurality of options are not displayed in the second region even when a touch operation on the second region is detected, and wherein in the case where the predetermined item has been moved to the second region by the touch operation, after the first predetermined time period has elapsed since the predetermined item was moved to the second region by the touch operation, the control unit controls such that the plurality of options are displayed in the second region in response to detection of a touch operation on the second region.

* * * * *